(12) United States Patent
Wirtz et al.

(10) Patent No.: US 7,392,896 B2
(45) Date of Patent: *Jul. 1, 2008

(54) TROUGH PAN FOR A FACE CONVEYOR WITH A LOADING RAMP

(75) Inventors: Jörg Wirtz, Kamen (DE); Siegfried Schmidt, Bottrop (DE)

(73) Assignee: DBT GmbH, Lunen (DE)

( * ) Notice: Subject to any disclaimer, the term of this patent is extended or adjusted under 35 U.S.C. 154(b) by 313 days.

This patent is subject to a terminal disclaimer.

(21) Appl. No.: 10/512,019

(22) PCT Filed: Apr. 25, 2002

(86) PCT No.: PCT/EP02/04589

§ 371 (c)(1),
(2), (4) Date: Oct. 19, 2004

(87) PCT Pub. No.: WO03/091541

PCT Pub. Date: Nov. 6, 2003

(65) Prior Publication Data

US 2005/0126891 A1    Jun. 16, 2005

(51) Int. Cl.
*B65G 19/28* (2006.01)

(52) U.S. Cl. .................................... 198/735.1; 198/727

(58) Field of Classification Search .............. 198/735.2, 198/735.4, 735.1, 725, 728, 729, 735.3
See application file for complete search history.

(56) References Cited

U.S. PATENT DOCUMENTS

| 2,633,230 | A | * | 3/1953 | Duncan | .................... | 198/735.6 |
| 2,951,579 | A | * | 9/1960 | Mayrath et al. | .......... | 198/735.2 |
| 4,108,495 | A | * | 8/1978 | Hauschopp et al. | ........... | 299/43 |
| 4,474,411 | A | * | 10/1984 | Peters et al. | ................... | 299/43 |
| 4,637,510 | A | * | 1/1987 | Tomlinson | ............... | 198/735.4 |
| 4,643,296 | A | * | 2/1987 | Braun et al. | ............. | 198/735.4 |
| 4,828,968 | A | * | 5/1989 | Okutsu | ....................... | 430/398 |
| 6,896,121 | B2 | * | 5/2005 | Vorsteher et al. | ......... | 198/735.2 |
| 6,966,429 | B2 | * | 11/2005 | Vorsteher et al. | ......... | 198/735.6 |

FOREIGN PATENT DOCUMENTS

DE        1 758 066        7/1970

(Continued)

OTHER PUBLICATIONS

International Search Report pertaining to International Application No. PCT/EP02/04589.

*Primary Examiner*—James R Bidwell
(74) *Attorney, Agent, or Firm*—Fay Sharpe LLP

(57) ABSTRACT

A conveyor pan 10 for face conveyors in underground coal mining systems has outward race 1 and return race 2, between which a conveyor bottom 9 is formed, with toggle sockets 21, with guide means for a mining machine which can be moved along the wall, in particular a drum cutter-loader, and with a static loading ramp connected on the wall side to the conveyor pan, and extending from the floor to the level of the outward race, by means of which muck can be loaded into the outward race as the face conveyor is advanced. The loading ramp includes an angled guide plate 50, the lower section 51 of which is steeper relative to the conveyor bottom 9 or the floor 11 than the upper section 52.

17 Claims, 2 Drawing Sheets

FOREIGN PATENT DOCUMENTS

| | | |
|---|---|---|
| DE | 2 049 156 | 4/1972 |
| DE | 32 23 575 | 7/1983 |
| DE | 32 15 715 | 11/1983 |
| DE | 32 15715 A1 | 11/1983 |
| DE | 32 35 473 | 3/1984 |
| GB | 650 495 | 5/1948 |
| GB | 1 239 015 | 7/1971 |
| GB | 2 096 671 | 10/1982 |
| SU | 967271 | 10/1982 |

* cited by examiner

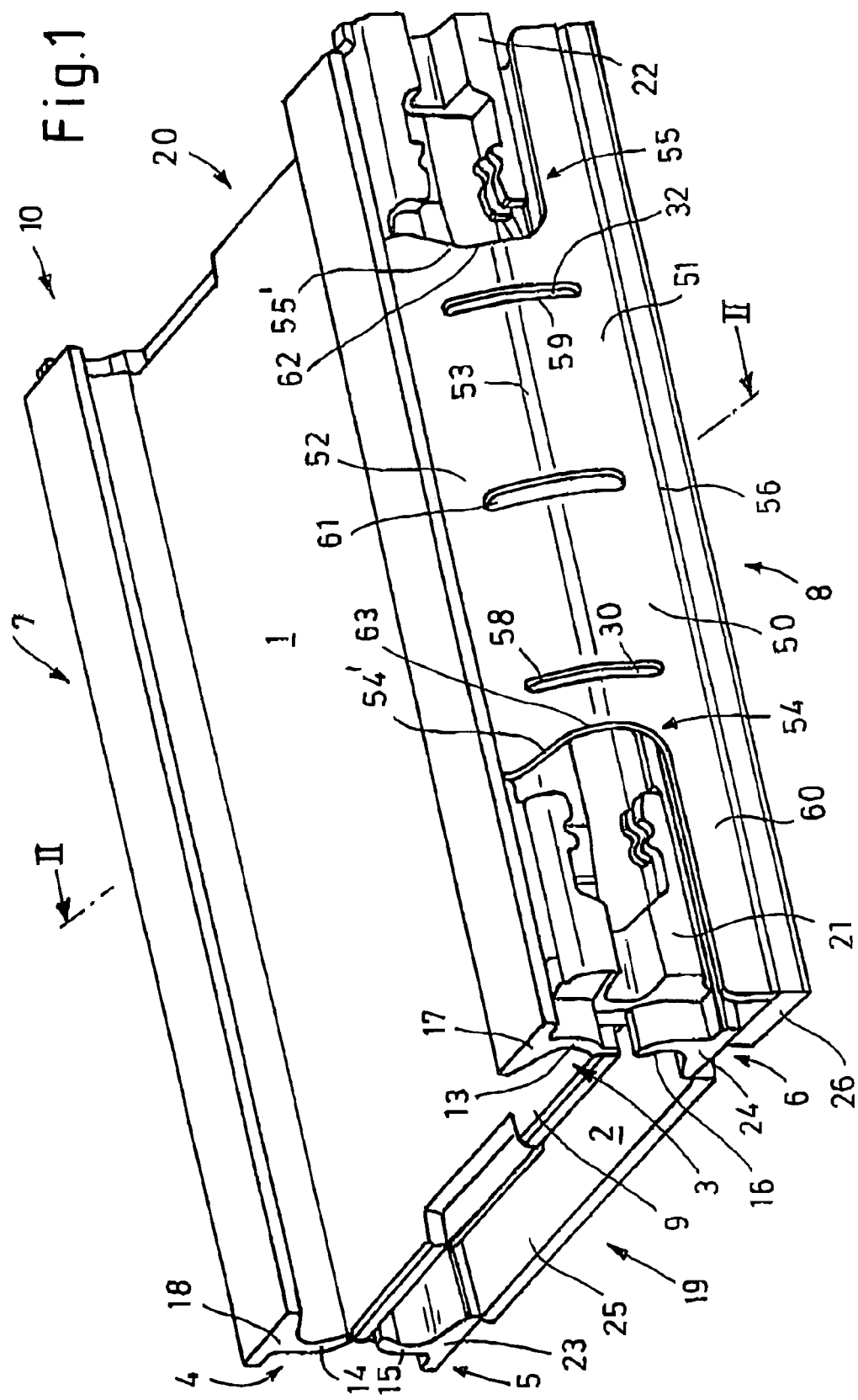

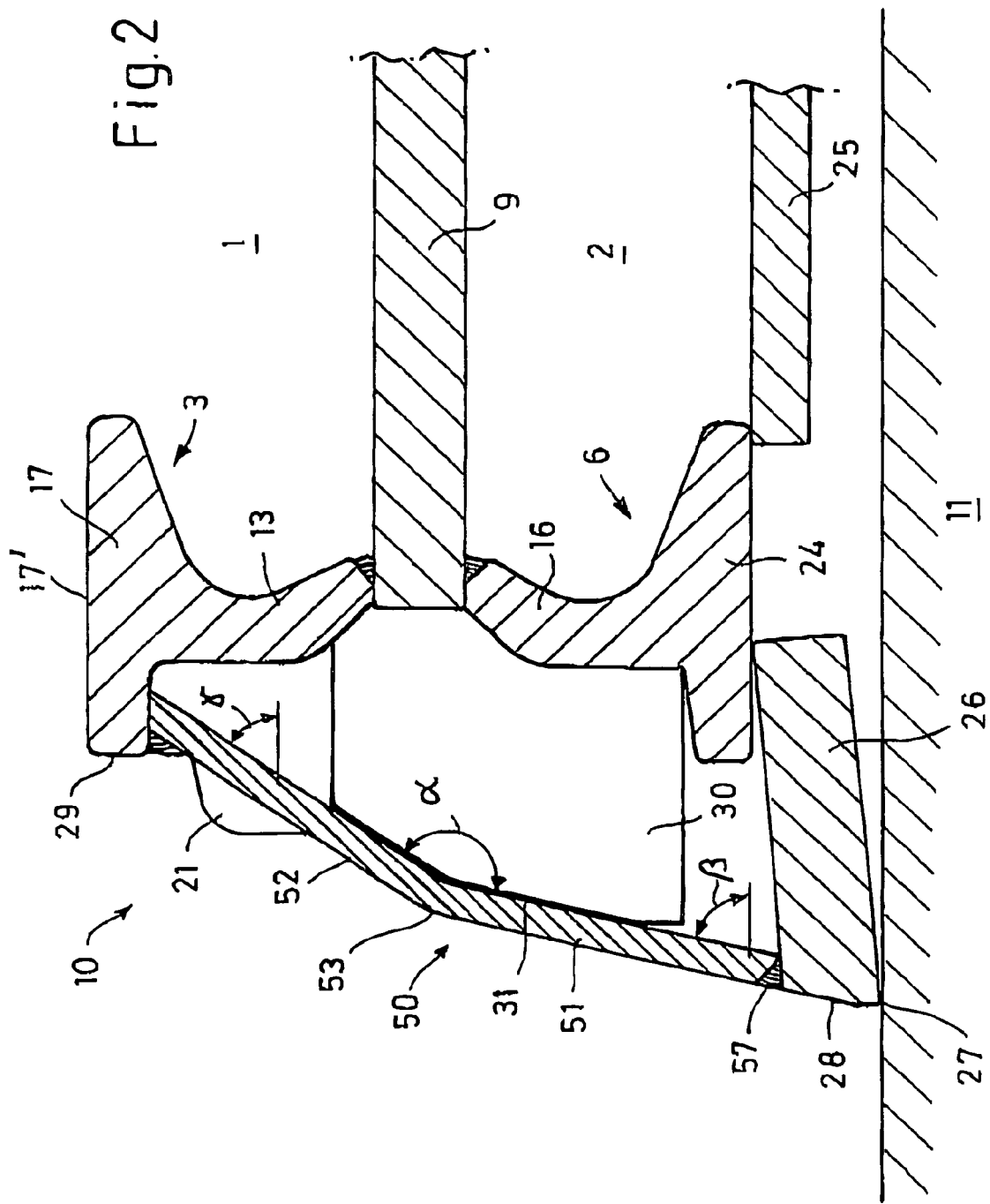

TROUGH PAN FOR A FACE CONVEYOR WITH A LOADING RAMP

BACKGROUND

The invention relates to a conveyor pan for face conveyors in underground winning or mining systems, in particular coal mining systems, with outward race and return race for guiding a scraper chain, between which a conveyor bottom is formed, with securing means attached to the ends of the conveyor pans on the goaf side and the wall side for a connecting component linking adjacent conveyor pans traction-proof together, preferably with guide means for a mining machine which may be moved along the wall and with a static loading ramp connected to the conveyor pan on the wall side and extending from the floor to the level of the outward race, by means of which muck may be loaded into the outward race as the face conveyor is advanced.

Conveyor pans for face conveyors are known in various embodiments. In underground workings in which the mining machine travels along the wall, as for example in workings using a plow, the muck can be loaded into the outward race of the face conveyor by means of special devices or guide plates on the mining machine. Conveyor pans with static loading ramps are used in particular in mining systems which operate using traveling mining machines, moving along between the conveyor and the wall, which have stationary mining machines, for example attached to the powered support assembly (DE 197 36 662), or which are designed as guides for drum cutter-loaders. In this type of workings with drum cutter-loaders the guide means on the wall side, for example a sliding rail or track for the drum cutter-loader, may simultaneously also form the lower section of the face conveyor loading ramp (DE 197 20 536).

Within face support systems, the conveyor pans connected together to form a face conveyor are advanced by means of the booms or pushers abutting the powered shield support frames. During advancing, the conveyor pans of the face conveyor tend to climb, in other words to rise up off the floor, and this disadvantageous climbing has to be countered with suitable control measures for adjusting the cutting horizon. Climbing of the face conveyor is particularly disadvantageous when, as in the case of drum cutter-loaders, the mining machine is guided along the face conveyor.

SUMMARY

In accordance with one aspect of the present invention, a new and improved conveyor pan is provided. On advantage of this conveyor pan is that the disadvantageous climbing of a face conveyor used herewith is minimized or reduced by constructional measures on the conveyor pan. More particularly, in accordance with this aspect of the present invention, the loading ramp consists of a curved or, in particular, an angled guide plate, the lower section of which is steeper relative to the floor or relative to the bottom of the channel than its upper section. Static loading ramps in the prior art consisted of modular components which on the wall side were attached to the side walls or side sections of the conveyor pans and a ramp which was flat for the entire extent of the conveyor pan, i.e. was disposed in a wedge-shaped position relative to the wall or to the floor or, alternatively, had a curved ramp with a relatively flat lower section, becoming steeper towards the outward race, and thus being curved towards the wall. It has been determined that by attachment of a wall-side guide plate and modification of the contour of the guide plate into a curve away from the wall the climbing tendency of the face conveyor during advancing is reduced. The curve entails in particular bending the guide plate such that its lower section is steeper. By means of these measures the static loading ramp is kept relatively short overall and increases the overall weight of the conveyor pan only slightly.

Object of the present invention is to minimize the disadvantageous climbing of a face conveyor by constructional measures on the conveyor pan.

This object is fulfilled by means of the invention as recited in claim 1. In accordance with the present invention the loading ramp consists of a curved or, in particular, an angled guide plate, the lower section of which is steeper relative to the floor or relative to the bottom of the channel than its upper section. Static loading ramps in the prior art consisted of modular components which on the wall side were attached to the side walls or side sections of the conveyor pans and a ramp which was flat for the entire extent of the conveyor pan, i.e. was disposed in a wedge-shaped position relative to the wall or to the floor or, alternatively, had a curved ramp with a relatively flat lower section, becoming steeper towards the outward race, and thus being curved towards the wall. The applicant has determined that by attachment of a wall-side guide plate and modification of the contour of the guide plate into a curve away from the wall the climbing tendency of the face conveyor during advancing is reduced. The curve entails in particular bending the guide plate such that its lower section is steeper. By means of these measures the static loading ramp is kept relatively short overall and increases the overall weight of the conveyor pan only slightly.

In one preferred embodiment of the conveyor pan, the apex line of the curve or the apex line of the bend of the guide plate may be disposed at the level of the conveyor bottom, preferably between the middle and the underside of the conveyor bottom and/or positioned below the center line of the point of application of force to the conveyor pan by the booms or pushers abbutting the support system, and consequently below the articulation point of the advancing system disposed on the goaf side for moving the face conveyor. A particularly preferred variant has a guide plate with sections angled relative to each other, with the lower and the upper section both being essentially flat and enclosing an angle of approximately 150°-170°, preferably approximately 160°±4°. It is also advantageous if the lower section is angled by approximately 65°-85°, preferably 78°±4° relative to the conveyor bottom and the upper section is angled by approximately 45°-65°, preferably 55°±4°, relative to the conveyer bottom.

For the assembly and disassembly of the face conveyor and for exchange of individual conveyor pans it is advantageous if the guide plate is fitted at the ends of the conveyor pan with recesses, which are matched in size to the dimensions of the securing means and/or conveyor pan connecting components. The securing means on the conveyor pan preferably consist of toggle bolt sockets and the conveyor pan connecting components preferably consist of toggle bolts, the heads of which can be inserted in the sockets. The recess may in particular be formed such that the lower section of the guide plate has or forms a bar at the lower edge, this bar extending as far as both conveyor pan ends, so that the guide plate at its lower edge is fully in contact with the conveyor pan's sheet metal bottom or similar and only has recesses at the respective conveyor pan ends, into which slack and fines can enter. Since after a short period of operation of the face conveyor these recesses clog up, the loading performance of the static loading ramp is not impacted by the recesses and the conveyor pan in accordance with this aspect of the present invention retains its lesser degree of disadvantageous climbing by comparison with generic conveyor pans. The limiting wall of the recess, which runs essentially parallel to the conveyor pan ends and continues as far as the level of the outward race, is preferably equipped with a detent, so that on the one hand sufficient clearance is provided to insert/remove the heads of the toggles, and on the other hand by means of the detent a type of cutout is created, thus giving, at the transition point from the guide plate to the recess, a better direction of the forces to be absorbed into the connected or welded-on area of the conveyor pan.

In one preferred embodiment the guide plate is welded to the conveyor pan. This is particularly advantageous if the lower section of the guide plate, in particular the bar at its lower edge, is welded to a bottom bar on the wall side, to a sliding bar or to a machinery guide for the mining machine. By means of the weld seam at the lower edge and the connection with a bottom bar or sliding bar the layers of muck disposed on the floor are forced upwards over the entire width of the conveyor pan as the conveyor is advanced, without its being possible for coal or similar in this area to penetrate behind the guide plate and cause disadvantageous climbing of the conveyor.

The guide plate in accordance with one aspect of the present invention may be used both with conveyor pans having lower race and outward race permanently attached to each other and with conveyor pans having a removable trough as the outward race. With the permanently attached outward race, the side section may consist of rolled steel sections and comprise an approximately T-shaped cross-section, as is known for example from DE 40 06 183 A1, rendering it possible for the upper section of the guide plate to be welded to the underside of the horizontal web of the L-shaped or T-shaped side section. With conveyor pans having a removable trough as the outward race the upper section of the guide plate is preferably welded to the framework holding the removable trough.

Since considerable forces are applied to the guide plate when the face conveyor is advanced and when muck is loaded into the outward race, it is preferable if at least two support plates are disposed between the guide plate and the side wall on the wall side and/or the side sections of the outward race and/or return race. This also makes it possible to keep the thickness of the guide plate relatively low. It is beneficial if the guide plate then features vertical slots at the level of the support plates, so that additional weld seams can be located in the slots, thus connecting the guide plate to the conveyor pan. The guide plate may be equipped with a hole for the hook of a lifting device, either between the slotted recesses and/or in the center.

One preferred application of the conveyor pans in accordance with the present invention is with face conveyors having guide means for a cutting mining machine, in particular having guide means for a drum cutter-loader. In the case of a conveyor pan having guide means for a drum cutter-loader the tendency to climb can be further minimized if the horizontal web of the outward race's side section on the wall side simultaneously forms the wall-side guide for the drum cutter-loader and the drum cutter-loader then runs on that horizontal web. These measures also allow the mining machine to be kept more compact, so that the roof shield over the shield supports can also be kept shorter than with conveyor pans featuring on the wall side a separate machine track ahead of the wall-side side section of the conveyor pans.

BRIEF DESCRIPTION OF THE DRAWINGS

FIG. 1 shows a perspective view of a conveyor pan in accordance with one aspect of the present invention with a guide plate welded on the wall side as the loading ramp; and FIG. 2 shows a partial cross-sectional view along line II-II in FIG. 1.

DETAILED DESCRIPTION

Conveyor pan 10 shown in perspective in FIG. 1 is used, for example, on center-chain or double center-chain scraper conveyors, on which the single or double scraper chain is guided approximately in the middle of the conveying trough and on which the ends of the scrapers are guided in guide channels, formed in upper outward race 1 and in return race or lower race 2 and, for example, limited by means of T-shaped side sections 3, 4, 5, 6. A face conveyor is then formed in the normal manner from individual conveyor pans 10. The longitudinal or goaf side 7 of the face conveyor, shown in the rear of FIG. 1, is disposed on the goaf side of a mine in which the conveyor pan 10 is employed, while the longitudinal side 8, shown in the front of FIG. 1, is aligned parallel to the wall in the underground face, not shown. Between outward race 1 and lower race 2 is a conveyor bottom 9, to which are welded—in the exemplary embodiment shown—all side sections 3, 4, 5, 6 with their supports 13, 14,15,16 facing conveyor bottom 9 and matched to the shape of the scrapers, not shown. In the exemplary embodiment shown, all side sections 3 to 6 are identical and consist of rolled steel sections of an essentially T-shaped cross-section, with the supports 13, 14, 15,16, matched in shape to the scraper ends, forming the "stalk" of the T and transitioning into a horizontal web 17, 18, 23, 24. Both on the goaf side and on the wall side, toggle sockets 21 or 22 are welded in the vicinity, respectively, of the conveyor pan ends 19 or 20 formed by the transverse sides, into which the toggle heads of toggle bolts engage in the normal manner, in order to join together adjacent conveyor pans 10 such that they are resistant to traction but have a slight permissible horizontal and vertical angular movement. The toggle sockets on the goaf side and the toggle bolts are not shown. A bottom plate 25 is welded in place below horizontal webs 23, 24 of the side sections 5, 6 of lower race 2. FIG. 1 also shows that, as is already known, conveyor bottom 9 is fitted at both conveyor pan ends 19, 20 with overlapping sections shaped to match each other.

In the illustrated embodiment, conveyor pan 10 comprises on the wall side 8 a static loading ramp for muck from loosened rock, in particular loosened coal, consisting of the guide plate identified in its entirety as 50, welded to conveyor pan 10 and extending from floor 11 (FIG. 2) up to the level of outward race 1. Guide plate 50 comprises a lower section 51 and an upper section 52, which are each essentially flat and are angled relative to each other at the apex line 53. In the area of the two toggle sockets 21, 22 guide plate 50 is fitted with recesses 54, 55, extending over the entire height of upper section 52 and over approximately half the height of lower section 51. The scale and dimensions of recesses 54, 55 on guide plate 50 are matched to the scale and dimensions of toggle sockets 21, 22 and to those of the toggle bolts, not shown, that can be engaged in the latter. Lower edge 56 of guide plate's 50 lower section 51 extends over the entire width of the conveyor pan, so that guide plate 50 forms a narrow bar 60 extending over the entire width of the conveyor pan, in order to direct the muck towards outward race 1 as the face conveyor is advanced. The lower edge of the bar 60 is welded to a sliding bar 26 by means of a weld seam (57, FIG.

2), with the sliding bar being welded below the horizontal web 24 of the lower side section 6 on the wall side. The sliding bar extends beyond the side wall of conveyor pan 10 formed by the outer faces of side sections 3, 6 and conveyor bottom 9, on the wall side. Bar 60 forms the lower limiting wall of recesses 54, 55 while the essentially vertical limiting wall 54', 55' of recesses 54, 55 is fitted approximately at the level of apex line 53 with a detent 62 or 63. As a result of detent 62, 63 the upper section 52 of the guide plates transitions in a curve into the conveyor pan. Detents 62, 63 and the curved shape reduce the danger of formation of fracture cracks in side section 3.

As FIG. 2 shows clearly, sliding bar 26 is slightly angled relative to the conveyor bottom or to sheet metal bottom 25 by approximately 5°, so that conveyor pan 10 is in contact with floor 11 in the underground face only in the frontal area 27 of the underside of sliding bar 26. FIG. 2 also shows in particular that guide plate 50 forming the loading ramp includes an angle x of approximately 160° between lower section 51 and upper section 52 and that lower section 51 of guide plate 50 is steeper relative to floor 11 or to conveyor bottom 9 than upper section 52. The bend of the lower, essentially flat section 51 of guide plate 50 relative to conveyor bottom 9 is shown in FIG. 2 as β and is approximately 78°±4°, while the angle γ of upper section 52 to conveyor bottom 9 is approximately 55°±4°. As a result of this differing slope of lower section 51 and upper section 52 and the overall extremely steep shape of loading ramp 50 between the wall-side front face 28 of sliding bar 26 and the front face 29 of horizontal web 17 of the outward race's side section 3, the conveyor pan in accordance with the illustrated embodiment is made considerably shorter than was the case with known conveyor pans.

Between guide plate 50 and the outer faces of side sections 3, 6 support plates 30, 32 are disposed, with the wall-side edges (e.g., wall-side edge 31 of plate 30) 31 being matched to the contour of the bend of guide plate 50. Support plates 30, 32 are welded to side sections 3, 6 and if appropriate also to conveyor bottom 9, and guide plate 50 features, as shown in FIG. 1, two vertical slots 58, 59, which run level with and parallel to support plates 30, 32, in order that weld seams in vertical slots 58, 59 may give additional reinforcement between guide plate 50 and support plates 30, 32. Between vertical slots 58, 59 a hook hole 61 is formed, being located in the center of guide plate 50 and being vertically disposed.

The representation of conveyor pan 10 does not show the guide means for a mining machine. In one preferred application of the conveyor pans, a mounting shaft with, for example, a drive rack for a drum cutter-loader is mounted on the goaf side and the upper face 17' of the horizontal web 17 of the wall-side side section 3 of outward race 1 forms a track for the drum cutter-loader.

In one embodiment, not shown, with removable trough the upper edge of the guide plate is welded to the frame construction for supporting and fixing the removable trough. In addition, ahead of the angled guide plate forming the static loading ramp a section of a machine track could also be formed. Instead of an angled guide plate with flat sections the guide plate could also be rounded or curved, within limits, and the apex line could also be located higher than the conveyor bottom. The securing means and conveyor pan-joining components could be different from the toggle sockets and matching toggle bolts shown, which would also cause the shape of the recesses to be different.

The exemplary embodiment has been described with reference to the embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A conveyor pan for face conveyors in underground mining systems, comprising:
   an outward race and a return race for guiding a scraper chain, between which a conveyor bottom is disposed,
   a securing means for a connecting component that links adjacent conveyor pans together is located on a goaf side and on a wall side,
   guide means for a mining machine which may be moved along a wall, and
   a static loading ramp connected to the conveyor pan on the wall side and extending from a floor to a level of the outward race, by means of which muck may be loaded into the outward race as the face conveyor is advanced, said loading ramp comprising a curved or angled guide plate, a lower section of which is steeper relative to an associated floor or to the conveyor bottom than an upper section thereof, wherein the lower section and the upper section of said angled guide plate are generally flat and include an angle therebetween of approximately 150°-170° and an apex line of the guide plate defined by the lower and upper sections is disposed at a level of the conveyor bottom.

2. The conveyor pan of claim 1, wherein the lower section is inclined relative to the conveyor bottom by an angle of approximately 74°-82° and the upper section is inclined relative to the conveyor bottom by an angle of approximately 51°-59°.

3. The conveyor pan of claim 1, wherein the guide plate is equipped at conveyor pan ends with recesses sized to match dimensions of at least one of the securing means and the conveyor pan-connecting component.

4. The conveyor pan of claim 1, wherein the securing means includes toggle bolt sockets for receiving toggle heads of the toggle bolts that are engageable in the toggle bolt sockets.

5. The conveyor pan of claim 1, wherein the lower section of the guide plate forms a bar at a lower edge thereof, which extends as far as pan ends of the conveyor pan.

6. The conveyor pan of claim 3, wherein a limiting wall of one of the recesses includes a detent parallel to pan ends of the conveyor pan.

7. The conveyor pan of claim 1, wherein the guide plate is welded to the conveyor pan.

8. The conveyor pan of claim 1, wherein the lower section of the guide plate is welded to a sliding bar on the wall side.

9. The conveyor pan of claim 1, wherein the upper section of the guide plate is welded to an underside or front face of a horizontal web of an approximately T-shaped or L-shaped rolled steel side section.

10. The conveyor pan of claim 1, wherein in a center area of the guide plate a hole for a lifting hook is defined.

11. The conveyor pan of claim 1, wherein at least two support plates are disposed between the guide plate and at least one of the side wall on the wall side, side sections of the outward race, and the return race.

12. The conveyor pan of claim 11, wherein the guide plate has vertical slots at the level of the support plates.

13. The conveyor pan of claim 1, wherein the guide means for a mining machine includes a horizontal web of the outward race's side section on the wall side.

14. A conveyor pan for a face conveyor used in underground mining systems, said conveyor pan comprising:

a conveyor bottom disposed between an outward race and a return race for guiding a scraper chain;

a securing means disposed on opposed ends of said conveyor bottom for engagement with an associated connecting component for linking adjacent conveyor pans together; and a loading ramp connected to said conveyor bottom on a wall side thereof for loading muck into said outward race, said loading ramp extending from an underlying support surface to said outward race and including:

a curved or angled guide plate having a lower front surface and an upper front surface, said lower front surface positioned at a greater angle relative to said support surface than said upper front surface, wherein an angle defined between said lower front face and said upper front face is approximately 150°-170°.

15. The conveyor pan of claim 14, wherein said upper front surface is included relative to said support surface at an angle of approximately 45°-65°.

16. The conveyor pan of claim 15, wherein said upper front surface is inclined relative to said support surface at an angle of approximately 51°-59°.

17. The conveyer pan of claim 14, wherein an apex line defined by said lower and upper front surfaces is disposed at a level of the conveyor bottom.

* * * * *